United States Patent
Hropak et al.

(10) Patent No.: US 12,322,177 B2
(45) Date of Patent: Jun. 3, 2025

(54) AUTOMATIC CONTENT RECOGNITION AND INFORMATION IN LIVE STREAMING SUITABLE FOR VIDEO GAMES

(71) Applicant: NVIDIA Corporation, Santa Clara, CA (US)

(72) Inventors: Alexander Hropak, Toronto (CA); Andrew Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/477,262

(22) Filed: Sep. 28, 2023

(65) Prior Publication Data
US 2024/0020975 A1    Jan. 18, 2024

Related U.S. Application Data

(63) Continuation of application No. 17/407,555, filed on Aug. 20, 2021, now Pat. No. 11,816,890.
(Continued)

(51) Int. Cl.
*G06V 20/40* (2022.01)
*A63F 13/537* (2014.01)
(Continued)

(52) U.S. Cl.
CPC .......... *G06V 20/41* (2022.01); *A63F 13/537* (2014.09); *G06N 3/045* (2023.01); *H04L 65/611* (2022.05)

(58) Field of Classification Search
CPC ..... G06V 20/41; A63F 13/537; H04L 65/611; G06N 3/045
See application file for complete search history.

(56) References Cited

U.S. PATENT DOCUMENTS 8,494,346 B2    7/2013   Abecassis et al.
10,922,744 B1 *  2/2021  Mahajan ................... G06T 7/70
(Continued)

FOREIGN PATENT DOCUMENTS

CN    103902805 A    7/2014
CN    107430630 A    12/2017
(Continued)

OTHER PUBLICATIONS

Hropak, et al.; Notice of Allowance for U.S. Appl. No. 17/407,555, filed Aug. 20, 2021, mailed Jun. 28, 2023, 12 pgs.
(Continued)

*Primary Examiner* — Reginald A Renwick
(74) *Attorney, Agent, or Firm* — Taylor English Duma L.L.P.

(57) ABSTRACT

In various examples, one or more Machine Learning Models (MLMs) are used to identify content items in a video stream and present information associated with the content items to viewers of the video stream. Video streamed to a user(s) may be applied to an MLM(s) trained to detect an object(s) therein. The MLM may directly detect particular content items or detect object types, where a detection may be narrowed to a particular content item using a twin neural network, and/or an algorithm. Metadata of an identified content item may be used to display a graphical element selectable to acquire the content item in the game or otherwise. In some examples, object detection coordinates from an object detector used to identify the content item may be used to determine properties of an interactive element overlaid on the video and presented on or in association with a frame of the video.

20 Claims, 9 Drawing Sheets

Related U.S. Application Data

(60) Provisional application No. 63/136,562, filed on Jan. 12, 2021.

(51) Int. Cl.
    *G06N 3/045*    (2023.01)
    *H04L 65/611*    (2022.01)

(56) References Cited

U.S. PATENT DOCUMENTS

| | | |
|---|---|---|
| 11,816,890 B2 | 11/2023 | Hropak et al. |
| 2019/0043201 A1 | 2/2019 | Strong et al. |
| 2021/0089780 A1* | 3/2021 | Chang .................. A63F 13/60 |

FOREIGN PATENT DOCUMENTS

| | | |
|---|---|---|
| CN | 111744193 A | 10/2020 |
| CN | 112148899 A | 12/2020 |
| WO | 2019183061 A1 | 9/2019 |

OTHER PUBLICATIONS

"4 ways to use X-Ray in Prime Video," Published Jul. 27, 2018. Retrieved from the Internet on Aug. 20, 2021 from URL <https://www.amazon.com/primeinsider/video/pv-xray-tips.html>, 3 pgs.
Hropak, Alexander; First Office Action for Chinese Patent Application No. 202210033274.5, filed Jan. 12, 2022, mailed Mar. 14, 2025, 14 pgs.

* cited by examiner

AUTOMATIC CONTENT RECOGNITION AND INFORMATION IN LIVE STREAMING SUITABLE FOR VIDEO GAMES

CROSS-REFERENCE TO RELATED APPLICATIONS

This application is a continuation of U.S. patent application Ser. No. 17/407,555, filed Aug. 20, 2021, which claims priority from Provisional U.S. Patent Application No. 63/136,562, filed Jan. 12, 2021. Each of which is hereby incorporated by reference in its entirety.

BACKGROUND

Live streaming allows gameplay of a game to be encoded to a video stream while the game is being played so that it can be viewed by an audience in real-time. The live streaming of games has grown in popularity with video game streamers such as professional streamer personalities, competitors, and professional eSports players attracting large followings. Thus, content of games may be viewed by many people including other players or potential players of the game. Some of these people may desire to acquire or obtain information regarding particular content items presented during a live stream, such as weapons, armor, skins, characters, loot crates, consumables, or other in-game items or objects.

Conventionally, streamers may mention or provide links to particular content items verbally or in a comments section of a video stream. However, viewers may have difficulty tracking down items mentioned by a streamer or may be interested in an item not specifically referenced by the streamer. In the context of streaming pre-recorded video, such as movies or television shows, content providers have baked metadata into the pre-recorded video. The metadata may be manually configured to identify specific times to provide information to viewers regarding actors when those actors appear on screen. Live streamed video (e.g., of video games, sports, television, etc.) presents difficulties that do not exist in pre-recorded video. For example, video for each match or round of a streamed game may be too different to pre-define metadata used to provide information regarding content in the video. It particular, often times it cannot not be known in advance where, when, or if particular content may appear in the video stream, or if it is clear enough to be visually identified by a viewer.

SUMMARY

Embodiments of the present disclosure relate to automatic content recognition and information in live streaming suitable for video games. The disclosure provide approaches for using trained machine learning models to recognize objects in gameplay video streams and determining content for which information can be presented to assist a viewer of the stream in acquiring the content.

In contrast to conventional systems, disclosed approaches may use one or more Machine Learning Models (MLMs) to identify particular content items in video streams (e.g., game streams) and present information associated with the content items to viewers of the video streams. In various examples, video (e.g., a live stream) of a game may be streamed to any number of user devices (e.g., smartphones, game consoles, personal computers, etc.) and applied to an MLM(s) trained to detect one or more objects therein. In some examples, output classes of an object detector may correspond to one or more particular content items. In further examples, a first MLM may be used to detect or identify one or more objects in a region(s) of a video, for example, using an object detector. A second MLM, such as a twin neural network, and/or an algorithm may then be used to identify a particular content item(s) from the detected objects.

In further respects, once a content item has been determined to be present in the video, metadata of the content item may be used to display information associated with the content item, such as one or more graphical elements selectable to acquire the content item in the game or otherwise. In some examples, the metadata may be used to present a link (e.g., via the graphical element(s)) or other information in the user interface of one or more viewers of the video, or may provide the information via e-mail, text, or some other means. For example, object and/or region detection coordinates from an object detector used to identify the content item may be used to determine a size, shape, and/or location of an interactive (e.g., graphical) element (e.g., a polygon) overlaid on the video and presented on or in association with a frame of the video.

BRIEF DESCRIPTION OF THE DRAWINGS

The present systems and methods for automatic content recognition and information in live streaming suitable for video games are described in detail below with reference to the attached drawing figures, wherein.

DETAILED DESCRIPTION

Figure 1:
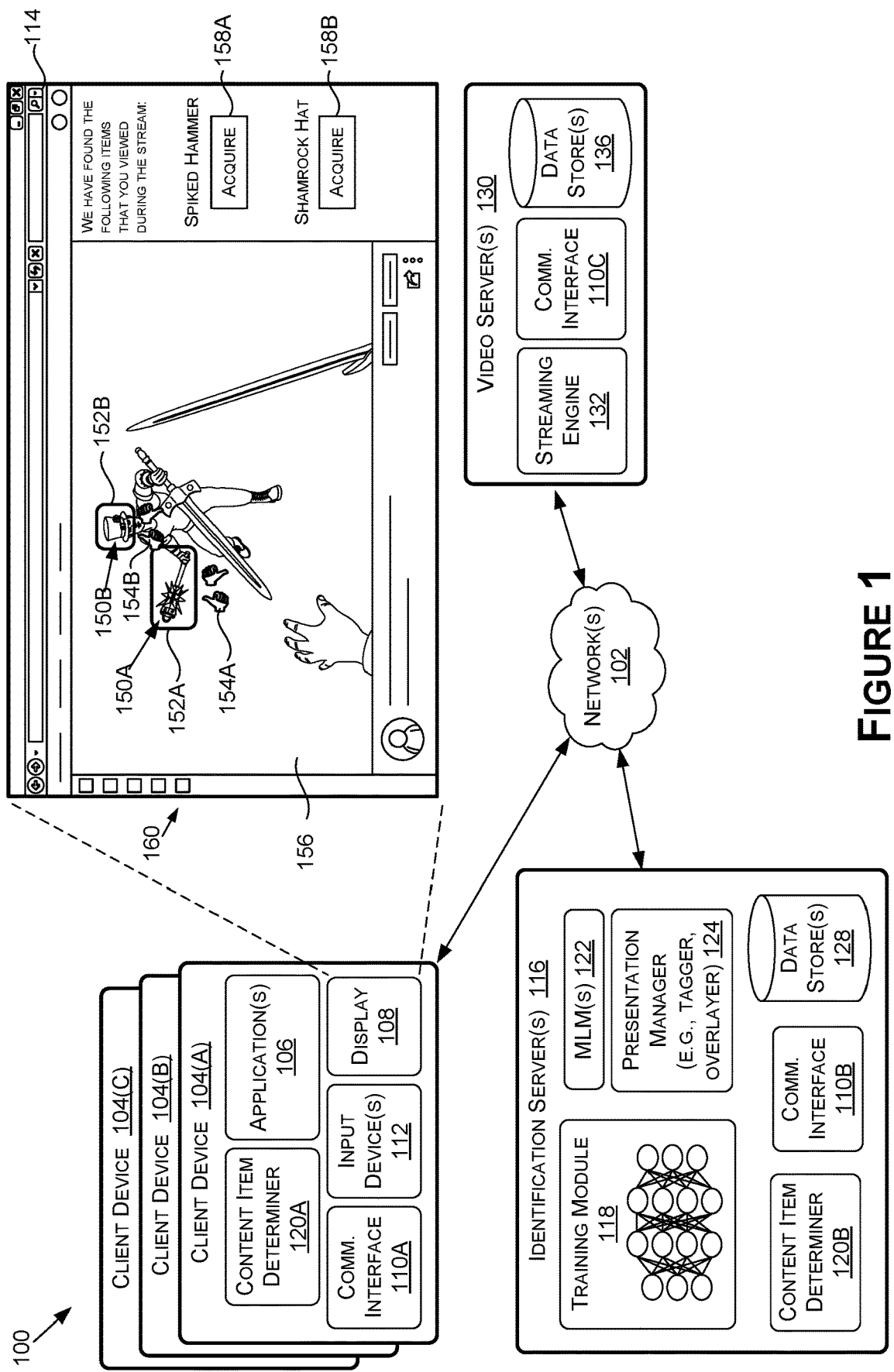
FIG. 1 is an example system diagram of a content item identification and presentation system, in accordance with some embodiments of the present disclosure.

Systems and methods are disclosed related to automatic content recognition and information in live streaming suitable for video games. The disclosure provide approaches for using trained machine learning models to recognize objects in gameplay video streams and determining content for which information can be presented to assist a viewer of the stream in acquiring the content.

In contrast to conventional systems, disclosed approaches may use a Machine Learning Model(s) to identify particular content items in video streams (e.g., game streams) and present information associated with the content items to assist viewers of the video streams in acquiring the content items. Using disclosed approaches, information regarding content items and/or services to acquire the content items or links thereto may be dynamically presented based on the content of a live video stream.

In various examples, video (e.g., a live stream) of a game may be streamed to any number of user devices (e.g., smartphones, game consoles, personal computers, etc.). The gameplay video may be presented in user interfaces of the user device(s) for viewing. For example, one or more of the user interfaces may be provided, at least in part, by a service and/or video platform that hosts video streams (e.g., YouTube, Netflix, Twitch, etc.). The video may comprise a live stream that is broadcast in real-time or near real-time, or may be previously recorded or re-broadcasted. A device(s), such as a server, a network device, or user device may apply the video to an MLM(s) trained to detect one or more objects (e.g., player characters, vehicles, game items, player skins, environmental elements, etc.) within a gameplay video. The MLM may be trained to detect objects that may appear within a single game or application (e.g., using training data from the game or application), or may be trained to detect objects that appear in multiple games or contexts (e.g., using a more general training dataset). For example, the MLM(s) may have been trained to detect objects in multiple games, collections or series of games, and/or in one or more versions or expansions of a game.

Based on an MLM(s) detecting one or more objects within a gameplay video, one or more content items within the video may be determined. The content items may be any of a number of virtual or real-life items that may appear within a gameplay video (e.g., player skins, items, weapons, gear, vehicles, etc.) and which may be acquired in-game or otherwise.

In some embodiments, the MLM(s) may be trained using annotated images of content items that the MLM is to detect. For example, an MLM may be trained using gameplay video of a game that includes the content items. In some examples, output classes of an object detector may correspond to one or more particular content items. In further examples, a first MLM may be used to detect or identify one or more objects in a region(s) of a video, for example, using an object detector. A second MLM and/or algorithm may then be used to identify a particular content item(s) from the detected objects.

In one or more embodiments, an MLM (e.g., the second MLM) used to identify content items may comprise a twin neural network. The twin neural network may be trained to encode representations of particular content items using positive and/or negative examples of the content items. In order to identify a content item, image data corresponding to a detected object (e.g., the region of the video) may be applied to the twin neural network to generate an encoding of the detected object. The encoding of the detected object may be compared to encodings produced by the twin neural network for one or more other content items to determine which content item (if any) is represented in the image data. For example, the comparison may be used to determine the similarity between the encodings and select a content item based on the similarity. In one or more embodiments, the content item may be selected based on the similarity exceeding a threshold value and/or based on being highest amongst the potential content items. It is noted that any number of frames may be used to identify one or more content items. Further, disclosed approaches may be suitable for identifying different instances of a content item in video despite variable viewing angles (front, back, etc.), sizes, lighting, and/or occlusions (e.g., images may be selected for the training dataset to include these variations).

In further respects, once a content item has been determined to be present in the video, metadata of the content item may be used to display information associated with the content item, such as one or more graphical elements selectable to acquire the content item in the game or otherwise. As various examples, the metadata may comprise various information that may be used to determine and/or present the information. Examples include a content identifier of the content item, a name of the content item, one or more frame identifiers associated with the content item (e.g., in which the content item was identified and/or in which to present the information), a link (e.g., a URL or URI) to a webpage or service that includes the information or enables a user to add the content item to a user account (e.g., of the game or service), and/or one or more portions of the information (e.g., textual and/or image based content). For example, the metadata may be used to present the link (e.g., via the graphical element(s)) or other information in the user interface of one or more viewers of the video, or may provide the information via e-mail, text, or some other means.

Where a link to a service is provided, the service may be hosted on a different server and/or system than the device(s) used to analyze the video for content items or many be hosted on the same server and/or system. Selection of an option corresponding to a link may directly or indirectly (e.g., via a further option or prompt) redirect a user device to the service. In at least one embodiment, selecting the option causes presentation of a second user interface (e.g., in a browser on the user device) that presents (e.g., from the service) information associated with the content item and one or more graphical elements selectable to acquire the content item in the game.

In some examples, the metadata for one or more content items may be provided (e.g., by a server) to the user devices. For example, one or more portions of the metadata for one or more content items may be transmitted to a user device in response to or based on identifying the content item(s) in one or more frames of the video. Transmitting the metadata may cause the user device to present the information and/or indicate that the content item(s) were identified. As further examples, one or more portions of the metadata for one or more content items may be transmitted to a user device prior to identifying the content item(s) in one or more frames of the video. For example, the metadata may be provided to the user device prior to or during viewing the video (e.g., based on determining the game or other media being viewed and possible content that may appear therein). In various examples, a server or other device may detect and/or identify the content item(s) in the video and/or the user device (e.g., user interface) may detect and/or identify the content item in the video (using the MLM(s)) and provide corresponding metadata to the user device. In embodiments where identification occurs at the user device, the metadata may be provided from the server and used to determine (e.g., request or access) or present the information for each identified content item.

Information associated with a content item(s) may be presented during and/or after the video used to identify the content item(s). In one or more embodiments, in response to or based on identifying a content item, the information (e.g., the graphical element(s)) may be displayed to the viewer (e.g., in the user interface). For example, object and/or region detection coordinates from the object detector that was used to identify the content item may be used to determine a size, shape, and/or location of an interactive (e.g., graphical) element (e.g., a polygon). The interactive element (an option) may be overlaid on the video and may be presented on or in association with a frame of the video used to detect the object (e.g., as the video continues to play or while the video is paused). Additionally or alternatively, the interactive element(s) may be presented for one or more other frames, such as using object tracking and one or more object detection regions. In one or more embodiments, information regarding a content item(s) may additionally or alternatively be presented outside of a video display region (e.g., in the user interface or a different user interface).

With reference to FIG. 1, FIG. 1 is an example system diagram of a content item identification and presentation system 100 (also referred to as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may include, among other things, one or more client devices 104(A), 104(B), and 104(C) (referred to collectively herein as "client devices 104"), identification server(s) 116, and/or a video server(s) 130. Although the client devices 104(A), 104(B), and 104(C) are illustrated in FIG. 1, this is not intended to be limiting. In examples, there may be any number of client devices 104. The system 100 (and the components and/or features thereof) may be implemented using one or more computing devices, such as the computing device 700 of FIG. 7, described in more detail below.

The client devices 104 may include a content item determiner 120A, an application 106, a communication interface 110A, an input device(s) 112, and/or a display 108. Although only a few components and/or features of the client device 104 are illustrated in FIG. 1, this is not intended to be limiting. For example, the client devices 104 may comprise additional or alternative components, such as those described below with respect to the computing device 700 of FIG. 7.

The identification server(s) 116 may include, among other things, a training module 118, MLM(s) 122, a content item determiner 120B, a presentation manager 124, a communication interface 110B, and/or data store(s) 128. Although only a few components and/or features of the identification server(s) 116 are illustrated in FIG. 1, this is not intended to be limiting. For example, the identification server(s) 116 may comprise additional or alternative components, such as those described below with respect to the computing device 700 of FIG. 7.

The video server(s) 130 may include, among other things, a streaming engine 132, a communication interface 110C, and/or one or more data store(s) 136. Although only a few components and/or features of the video server(s) 130 are illustrated in FIG. 1, this is not intended to be limiting. For example, the video server(s) 130 may comprise additional or alternative components, such as those described below with respect to the computing device 700 of FIG. 7.

As an overview, one or more content item determiners, such as a content item determiner 120A and/or 120B (referred to herein as "content item determiner(s) 120") may include one or more components and features for determining one or more content items, such as content items 150, in video and may be located, at least partially on any combination of a client device 104 and/or the identification server(s) 116. An application 106 may include one or more components and features for displaying gameplay video or other video content in one or more user interface(s) 160 on the display 108 of a client device 104. The gameplay video or other video content may be received from the video server(s) 130 and/or the identification server(s) 116 over the network(s) 102 using the communication interface 110A for presentation in the user interface 160.

The training module 118 may include one or more components and features for training the MLM(s) 122 to detect objects and/or identify content items in video. Once trained, a content item determiner 120 may apply video data to the MLM(s) 122 to detect objects and identify content items in the video data. The presentation manager 124 may generate and/or determine content to display on a client device(s) 104 such as annotations and overlays which may be communicated to an application 106 of a client device(s) 104 over the network(s) 102. It at least one embodiment, the display of content in, for example, the user interface 160, may be effectuated based at least on metadata (e.g., associated with particular video frames and/or times tamps) provided and/or generated by the presentation manager 124.

The streaming engine 132 may include one or more components and features for generating, distributing, and managing streaming data such as video streams, audio streams, and/or other types of data streams that may be used by a streaming platform and presented in a user interface, such as the user interface 160. Streaming data may be located on one or more data store(s) 136, retrieved by the streaming engine 132, and communicated over one or more network(s) 102 using a communication interface 110C to transmit streaming data to the identification server(s) 116 and/or client device(s) 104. As further examples, the streaming engine may receive the streaming data from one or more external devices, such as a client device 104, and relay the stream to one or more other external devices, such as one or more other client devices 104 or the identification server 116.

Components of the system 100 may communicate over a network(s) 102. The network(s) 102 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the system 100 may communicate with one or more of the other components via one or more of the network(s) 102.

The client devices 104 may include a smart phone, a laptop computer, a tablet computer, a desktop computer, a wearable device, a game console, a virtual reality system (e.g., a headset, a computer, a game console, remote(s), controller(s), and/or other components), an NVIDIA SHIELD, a smart-home device that may include an intelligent personal assistant (e.g., an AMAZON ECHO, a GOOGLE HOME, etc.), and/or another type of device capable of supporting streaming of video.

An application 106 may be a mobile application, a computer application, a console application, a web browser application, a video streaming platform application, and/or another type of application or service. In some embodiments, multiple applications 106 may be employed. For example, the user interface of FIG. 1 may be displayed in one application and the GUI 200 of FIG. 2 may be displayed in another application 106. An application 106 may include instructions that, when executed by a processor(s), cause the processor(s) to, without limitation, receive input data representative of user inputs to the one or more input device(s) 112, transmit the input data to the video server(s) 130 and/or the identification server(s) 116, in response receive a video stream from the video server(s) 130 and/or the identification server(s) 116 using the communication interface 110A, and cause display of the video on the display 108. In other words, the application 106 may operate as a facilitator for enabling streaming of video 156 of gameplay or other content associated with the application on the client devices 104. In some examples, the application 106 may receive metadata (e.g., content item data) from the identification server(s) 116 using the communication interface 110A and may cause display of content item information 152 derived using and/or directed by the metadata on the display 108. In some examples, the metadata includes an indication of one or more frames of the video 156 and content item information 152, and/or graphical feedback element(s) 154 associated with the one or more frames of the video 156. The application 106 may determine how, when, and/or where to display content according to the metadata.

In some examples, the client devices 104 may use the application 106 to display the gameplay video or other video content on the display 108. In some examples, a first client device, such as the client device 104(A), may display the video while a second client device, such as client device 104(B), may present information associated with the content item(s) identified in the video. In examples where the display data is received by the client device 104, the system 100 may be part of a game streaming system, such as the game streaming system 8 of FIG. 8, described in more detail below.

The client device 104(A) may display, via the display 108, a video stream 114. The video stream 114 may include any number of gameplay video streams presented to the user of the client device 104(A). Similarly, users of each of the client devices 104, in addition to the client device 104(A), may view streams of any number of video streams 114. As described herein, a video stream 114 may be a live or real-time broadcast stream. In some examples, the video stream 114 may be a previously recorded or re-broadcast of a video.

The video stream 114 may be presented in relation to one or more interfaces such as the user interface 160. The user interface(s) 160 may also include elements that allow a user to control the playback or presentation of the video 156. For example, the user interface(s) 160 may allow a user selectively pause or resume a live stream. In some embodiments, the user interface(s) 160 may contain information and interactive elements in addition to the video 156. For example, the user interface(s) 160 may contain the video 156 and content that leverages user account information. In some examples, the user interface(s) 160 may contain the video 156 and interactive elements such as a chat or messaging interface.

The video stream 114 may include the video 156 of gameplay of a game (e.g., gameplay that is being broadcasted) or other content. The video 156 may additionally include objects (e.g., of a game, such as player characters, vehicles, game items, player skins, environmental elements, etc.). Objects in the video 156 include one or more content items, such as a content item 150A and a content item 150B (referred to herein as "content item(s) 150"). Although the content item(s) 150 are illustrated in FIG. 1, this is not intended to be limiting. In any example, there may be any number of content items 150. The content items 150 may correspond to any of a number of virtual or real-life items that may appear within the video 156 (e.g., player skins, items, equipment, weapons, gear, vehicles, etc.) and which may be acquired in-game or otherwise.

In some examples, the video stream 114 may include content information, such as content item information 152A and 152B (referred to herein as "content item information 152"), such as graphical elements that provide information about one or more of the content items 150. The content item information 152 may be visually represented, for example, as a bounding region(s) of the object(s). Although, bounding region(s) are illustrated in FIG. 1, this is not intended to be limiting. In some examples, there may be any of a number of content item information 152 related to the content items 150, which may take any of a variety of different forms. Examples include overlays, annotations, arrows, color changes, highlighted appearance, text, and/or any other indication or information related to the content items 150.

In at least one embodiment, the content item information 152 may rely on object tracking to track one or more object on the display 108 over a number of frames based on movement of an associated content item(s) 150. In some examples, the content item information 152 about the content items 150, may be presented in same user interface 160 that presents the video 156. The content item information 152 about the content items 150, may be presented in, over, or with a same frame(s) as the video 156 in which the content item(s) 150 was identified. In other examples, the content item information 152 may be presented in one or more other user interfaces on the display 108 or a different display, or may be presented after a frame in which the content item(s) 150 was identified (e.g., at the end of the video 156). In some examples, the content item information 152 may be presented on a different client device 104 than displays the video stream 114.

In further examples, the video stream 114 may include one or more graphical feedback elements, such as a graphical feedback elements 154A and/or 154B (referred to herein as "graphical feedback element(s) 154") that allow a user to interact with or provide input or feedback regarding the content items 150. A graphical feedback element 154 may be represented in the user interface(s) 160 as an option or other selectable interface element with which a user may interact using an input device(s) 112 of the client device(s) 104 (e.g., a thumbs up/down button, like/dislike selection, option to save, etc.). In some examples, the graphical feedback element(s) 154 may be presented at a location that corresponds to a region of the video 156 in which content item(s) 150 have been identified. User input and/or interaction with the graphical feedback element(s) 154, may cause the content item information 152 about the content items 150 to be presented in one or more user interface(s) 160.

User input provided to the graphical feedback element(s) 154 may, for example, be used to determine for which of the content items 150 the related content item information 152 is presented. For example, if a user selects a "thumbs up"

option as part of the graphical feedback element 154A in the video stream 114, content item information 152A may be provided in the user interface(s) 160 about the content items 150A, while if a "thumbs down" option is selected, the content item information 152A may not be presented, alternative information may be presented in its place, or the content item information 152A may be removed from the user interface 160. As further examples, the graphical feedback elements may similarly impact the presentation of acquisition link 158A or 158B, described in further detail herein. In some embodiments, feedback received from the graphical feedback element(s) 154 may be provided to the presentation manager 124 to refine graphical feedback element(s) 154 and/or content item information 152 that are generated and presented in subsequent video streams.

The video stream 114 may include additional graphical elements that provide one or more acquisition links, such as acquisition links 158A and 158B (referred to herein as "acquisition link(s) 158"), that are selectable by a user to acquire one or more corresponding ones of the content items 150. In at least one embodiment, acquisition link(s) 158 may be selectable by a user to access one or more user interface(s) 160. For example a user can select the acquisition link 158B in the user interface 160 to acquire the "Shamrock Hat" identified as the content item 150B in the video stream 114 and may be presented with the GUI 200 of FIG. 2 in the user interface 160 or a different user interface. The acquisition link(s) 158 may be represented, for example, as a selectable button, link, or any other selectable element. Although, the acquisition link(s) 158 are illustrated as buttons in FIG. 1, this is not intended to be limiting. In some examples, there may be any of a number of acquisition links 158 related to one or more of the content items 150. In some examples, a user selecting an acquisition link 158 may immediately acquire a content item(s) 150. This may include adding the item to the user's in-game account. In other examples, a user selecting an acquisition link 158 may provide information on how to acquire the content item(s) 150 (e.g., providing a link or redirect to the item page at store, adding the item to a user's cart, or providing information on steps to acquire the item, availability of the item, or a location of the content item(s) 150, etc.). In further examples, the content item acquisition link(s) 158 may be presented on a content device(s) 104 and/or user interface(s) 160 different from one displaying the video stream 114 (e.g., in an e-mail, text message, notification, pop-up, etc.). In at least one embodiment, one or more of the content item information 152A or 152B may comprise an acquisition link, similar to the acquisition links 158A or 158B. In such examples, a content item information 152 may be presented using an interactive element.

The display 108 may include any type of display capable of displaying the video (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 may include any type of devices that are capable of providing user inputs to the game. The input device(s) may include a keyboard, a mouse, a touch-screen display, a controller(s), a remote(s), a headset (e.g., sensors of a virtual reality headset), and/or other types of input devices.

The communication interfaces such as communication interface 110A, communication interface 110B, and communication interface 110C (referred to collectively or individually herein as "communication interface(s) 110") may include one or more components and features for communicating across one or more networks, such as the network(s) 102. The communication interface(s) 110 may be configured to communicate via any number of network(s) 102, described herein. For example, to communicate in the system 100 of FIG. 1, the client devices 104 may use an Ethernet or Wi-Fi connection through a router to access the Internet in order to communicate with the identification server(s) 116, the video server(s) 130, and/or with other client devices 104.

The identification server(s) 116 may include one or more servers for generating, training, managing, storing, and/or using components for detecting and identifying content items in video, such as the video 156. Although only a few components and/or features of the identification server(s) 116 are illustrated in FIG. 1, this is not intended to be limiting. For example, the identification server(s) 116 may include additional or alternative components, such as those described below with respect to the computing device 700 of FIG. 7.

As further illustrated in FIG. 1, the identification server(s) 116 may be separate or distinct from the video server(s) 130 and/or a client device 104; however, this is not intended to be limiting. For example, the identification server(s) 116 may be the same or similar servers to the video server(s) 130 and/or one or more components thereof may be at least partially on a client device(s) 104. In some examples, the identification server(s) 116 may be operated or hosted by a first entity (e.g., a first company) and the video server(s) 130 may be operated or hosted by a second entity (e.g., a second, different company). In such examples, the second entity may be a video streaming service, and the first entity may develop training datasets from data (e.g., video data) received from the second entity. In other examples, the identification server(s) 116 and the video server(s) 130 may be operated or hosted, at least partially, by the same entity.

The identification server(s) 116 may comprise the communication interface 110B that may include one or more components and features for communicating across one or more networks, such as the network(s) 102. The communication interface 110B may be configured to communicate via any number of network(s) 102, described herein. For example, to communicate in the system 100 of FIG. 1, the identification server(s) 116 may use an Ethernet or Wi-Fi connection through a router to access the Internet in order to communicate with the client device(s) 104, the video server(s) 130, and/or with other identification server(s) 116.

The identification server(s) 116 may include one or more application programming interfaces (APIs) to enable communication of information (e.g., video data, game information, user account information, etc.) with the video server(s) 130. For example, the identification server(s) 116 may include one or more game APIs that interface with a streaming engine 132 of the video server(s) 130 to receive video data for training an MLM(s) 122 using a training module 118, and/or detecting content item(s) in video using the content item determiner 120B. As a further example, the identification server(s) 116 may include one or more APIs that interface with the application 106 (and/or the content item determiner 120A) of a client device 104 for transmitting information relating to a content item (e.g., in response to detecting a content item in gameplay video) to enable the application 106 of a client device 104 to provide the information associated with the content item in a display 108. Although different APIs are described herein, the APIs may be part of a single API, two or more of the APIs may be combined, different APIs may be included other than those described as examples herein, or a combination thereof.

The identification server(s) 116 may include a training module 118 for learning objects that may be detected within gameplay video. Although FIG. 1 includes an illustration of a neural network, this is not intended to be limiting. For example, the training module 118 may be used to train machine learning model(s) 122 of any type, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptions, long/short terms memory, Hopfield, Boltzmann, deep belief, deconvolutional, generative adversarial, liquid state machine, etc.), twin neural networks, and/or other types of machine learning models.

Video data may be applied to the MLM(s) 122 by the training module 118, where the MLM(s) 122 learns to detect one or more objects in a video and/or content items presented in video data. In some examples, the video data may be applied to one or more MLM(s) 122 (e.g., neural networks) to be trained using reinforcement learning or inverse reinforcement learning. For example, to learn to detect or identify objects in video, inverse reinforcement learning may be used to observe objects and content items through many video streams and learn to detect objects from any number of angles, scales, and/or occlusions (e.g., blocked visibility, low resolution, etc.). The video data may be stored in a data store(s) 128. In addition, the data used by, and generated by the training module 118 to train the MLM(s) 122 may be stored in the data store(s) 128.

The video data may include gameplay video data, game data, user account data, image data, audio data, and/or other data representing or capturing one or more portions of a game or other content. For example, the video data may include video frames of gameplay and the audio data associated of that gameplay. In some examples the video data may include information such as user account information (e.g., an account of a user that is viewing streaming video) and/or game information (e.g., information indicating name of game, version of game, etc.). The video data may capture the environment, the objects, the values, and/or other information of a video stream 114. The video data may be stored with associated annotated or tagged images of content items that the MLM(s) 122 is trained to detect.

The MLM(s) 122 may be trained by the training module 118, to detect one or more objects in a video and/or content items presented in video data. The MLM(s) 122 may be trained to detect objects in certain contexts (e.g., trained to detect objects within a single game title) or may be trained to detect objects over any of a number of video contexts (e.g., multiple game titles, versions, expansions, DLC, genres, game systems, etc.). For example, the MLM(s) 122 may be trained by the training module 118 and used by the content item determiner 120B to detect objects in gameplay video of multiple games or a specific genre or type of gameplay (e.g., first person shooter, strategy, sports, puzzle, etc.). Training an MLM 122 to detect objects for a context may include using image data from the context as training data.

The MLM(s) 122 may be trained to determine that an object detected in a gameplay video is a particular content item(s) 150. The content items 150 may be any of a number of virtual or real-life items that may appear within a gameplay video (e.g., player skins, items, sport equipment, clothes, weapons, gear, vehicles, etc.). The MLM(s) 122 may be trained with annotated or labeled training images of content items 150 or with gameplay video of a game that includes the content items 150 or similar objects. In some examples, the MLM(s) 122 may be trained by the training module 118 to identify different instances of a content item 150 that may have variable visual properties (e.g., variable viewing angles, sizes, lighting, occlusions, etc.). This may include selecting and providing training images to the MLM(s) 122 that depict variations to those variables.

The MLM(s) 122 may be of any suitable type, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptions, long/short terms memory, Hopfield, Boltzmann, deep belief, deconvolutional, generative adversarial, liquid state machine, etc.), twin neural networks, and/or other types of machine learning models.

In at least one embodiment, the MLM(s) 122 may comprise a twin neural network that may be trained to encode representations of a content item(s) 150 using positive and/or negative examples of the content item(s) 150. Once deployed, one or more content item determiner(s) 120, such as a content item determiner 120A and/or 120B may use the MLM(s) 122 to determine one or more content items 150 in video. As shown, a content item determiner 120 may be located, at least partially on any combination of a client device 104 and/or the identification server(s) 116, which may vary for different embodiments. For example, some embodiments may include a content item determiner 120A and not a content item determiner 120B, and vice versa.

A content item determiner(s) 120 may use the one or more MLMs 122 to encode an object detected in video data (e.g., detected by an MLM 122). The encoding of the object can be used by the content item determiner 120 to identify a content item(s) 150. For example, the encoding of the detected object may be compared to other encodings produced by the twin neural network of the MLM(s) 122 to determine if a content item(s) 150 is represented in the video data. In some examples, the content item determiner(s) 120 may compare the encodings to determine a similarity or matching between the encodings in order select one or more content item(s) 150. For example, the content item determiner(s) 120 may select a content item(s) 150 based on the similarity between encodings meeting or exceeding a threshold value and/or based on any of a number of methods to score or rank confidences in matchings.

A content item determiner 120 may use the communication interface 100A and/or 110B to access the video data being analyzed over the network(s) 102 and/or from local or remote storage, such as the data store(s) 128. A content item determiner 120 may operate as a facilitator for retrieving and applying video data to an appropriate MLM(s) 122, post-processing output of the MLM(s) 122, and communicating metadata generated or determined at least on the post-processing (e.g., communicating the metadata to the presentation manager 124 and/or application 106). In some examples, the content item determiner 120 may apply video data to an MLM(s) 122 and determine or identify a particular content item(s) 150 in the video data based on output therefrom. The presentation manager 124 may then generate overlays and/or information related to the determined content item(s) 150 for presentation to one or more users and/or viewers associated with a corresponding video stream 114.

The presentation manager 124 may generate and/or determine content to display on a client device(s) 104. For example, the presentation manager 124 may generate and/or determine annotations and overlays which may be communicated to an application 106 of a client device(s) 104. The presentation manager 124 may, for example, be located on one or more of the identification server(s) 116. In some examples, a presentation manager(s) 124 may be included in an application 106 or otherwise be hosted on a client device(s) 104. While the presentation manager 124 is shown on the identification server(s) 116, in one or more embodiments, the presentation manager 124 may be located, at least partially, on one or more client devices 104 and/or the video server(s) 130. Other locations of components are may be similarly varied, such as the content item determiner 120, the data store(s) 128, the MLM(s) 122, and/or the training module 118, etc. Additionally, in some embodiments, the identification server(s) 116 may include one or more of the video server(s) 130.

Figure 2:
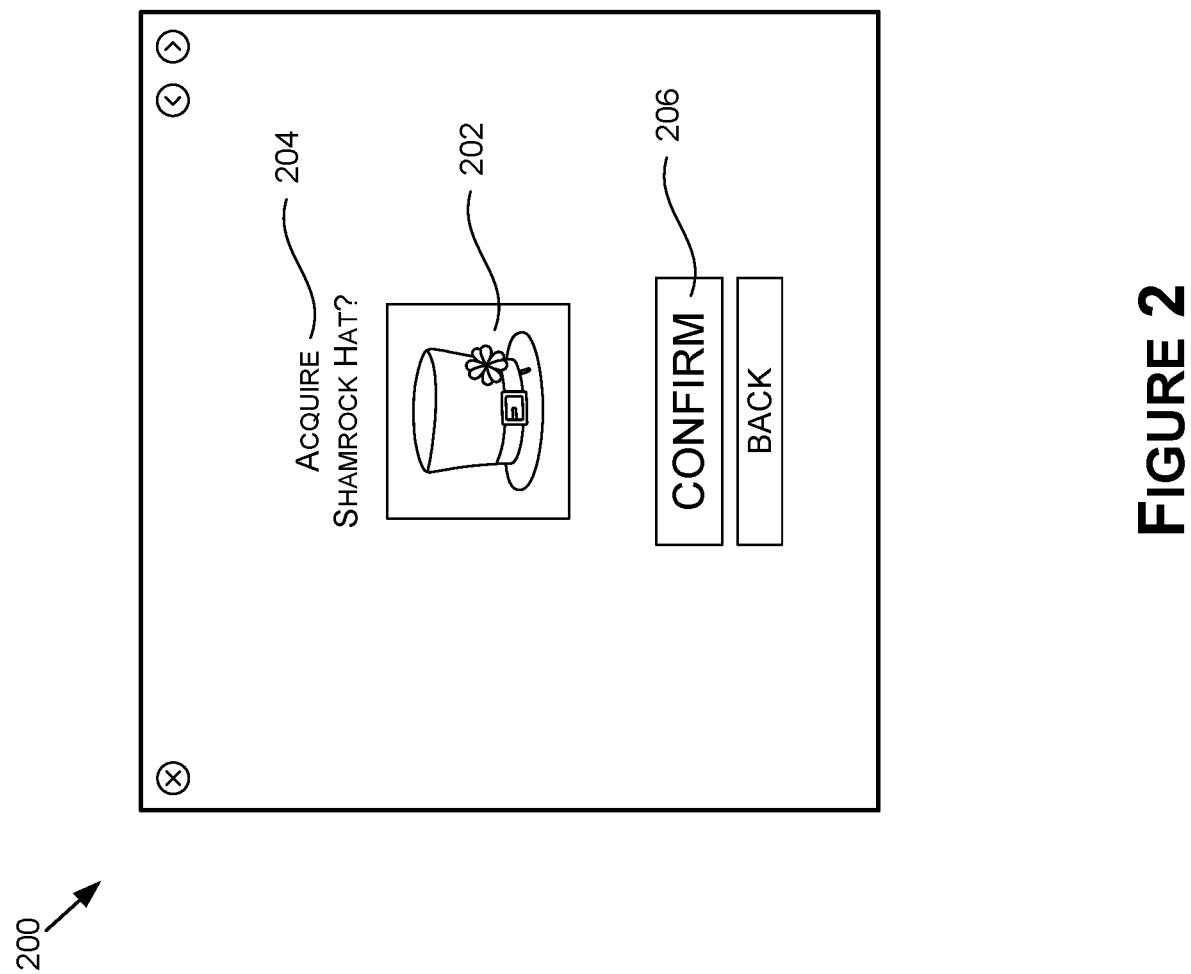
FIG. 2 is an example screenshot from a graphical user interface (GUI) for acquiring a content item in accordance with some embodiments of the present disclosure.

Now referring to FIG. 2, FIG. 2 is an example screenshot from a graphical user interface (GUI) 200 for acquiring a content item, in accordance with some embodiments of the present disclosure. The GUI 200 as shown in FIG. 2 may be part of a larger GUI. For example the GUI 200 as shown may be a GUI region or window presented within an enclosing GUI. In some embodiments, the GUI 200 may be part of or presented with the application 106 of the client device(s) 104. As further examples, the GUI 200 may be part of or presented with applications other than the application 106. Further, the GUI 200 may be presented on a client device(s) 104 that is different from a client device(s) 104 displaying the video stream 114 (e.g., in the application 106).

The GUI 200 may present a user with content item information 204 that may be associated with a content item. For example, the GUI 200 may prompt a user with the content item information 204, such as an option to acquire the content item "Shamrock Hat." The content item information 204 may include any information associated with the content item. For example, the content item information 204 may include a name, attributes, rarity, availability, features, abilities, description, or any other information related to the content item or similar items.

In at least one embodiment, the GUI 200 may be presented at the same time as the video stream 114. In some examples, the GUI 200 may be presented after the video stream 114 has completed. For example, the GUI 200 may be presented on the display 108 of a client device(s) 104 at the conclusion of a video stream broadcast or after any duration of time.

In at least one embodiment, the GUI 200 is presented based at least on user interaction with the application 106, content item information 152, and/or a graphical feedback element 154. For example, the GUI 200 may be presented if a user interacts an option, such as with the graphical feedback element 154B and/or the acquisition link 158B associated with the content item 150B identified in the video stream 114. In such examples, the graphical feedback element 154B or the acquisition link 158B may comprise a link presented (e.g., via the graphical element(s)) or other information in the user interface of FIG. 1 of a viewer of the video). The link may be to a service that provides the GUI 200 and/or manages a backend thereof. The service may be hosted on a different server and/or system than the device(s) used to analyze the video 156 for content items (e.g., a client device 104 and/or an identification server 116) or many be hosted on the same server and/or system (e.g., on an identification server 116). Selection of the option corresponding to the link may directly or indirectly (e.g., via a further option or prompt) redirect a user device to the service and/or the GUI 200. In other examples, selecting the option may interface with the third party or external service without necessarily requiring presentation of a second user interface, such as the GUI 200. For example, the option may be used to acquire the content item 150 directly from the user interface of FIG. 1 through the service. The GUI 200 may contain a region that presents a content item depiction(s) 202, which may include graphical elements representative of the content item. For example, the content item depiction 202 may include an image, video, and/or audio associated with the content item. An image and/or other information presented regarding a content item may be captured by the presentation manager 124 from the video 156, or elsewhere, and may be referenced and/or accessed using a content identifier of the content item. In one or more embodiments, a content item depiction(s) may be stored locally or retrieved from a data store using the content identifier. For example, each content item may be associated with assets that are retrieved from one or more data stores 128 (e.g., from or by an identification server(s) 116). In some cases, the content item depiction 202 may include a video or series of image frames. For example, the GUI 200 may present a portion of the gameplay video that contains the content item (e.g., in which the content item was detected using the MLM(s) 122), or may present video from a different game session that includes the content item.

In some embodiments, the GUI 200 may include a graphical element(s) 206 that is selectable to acquire the content item. The graphical element(s) 206 may be selectable to allow a user to acquire the presented content item in a particular game. For example, the graphical element 206 may be selectable by a user to confirm that they would like to acquire the content item such as the "Shamrock Hat."

Figure 3:
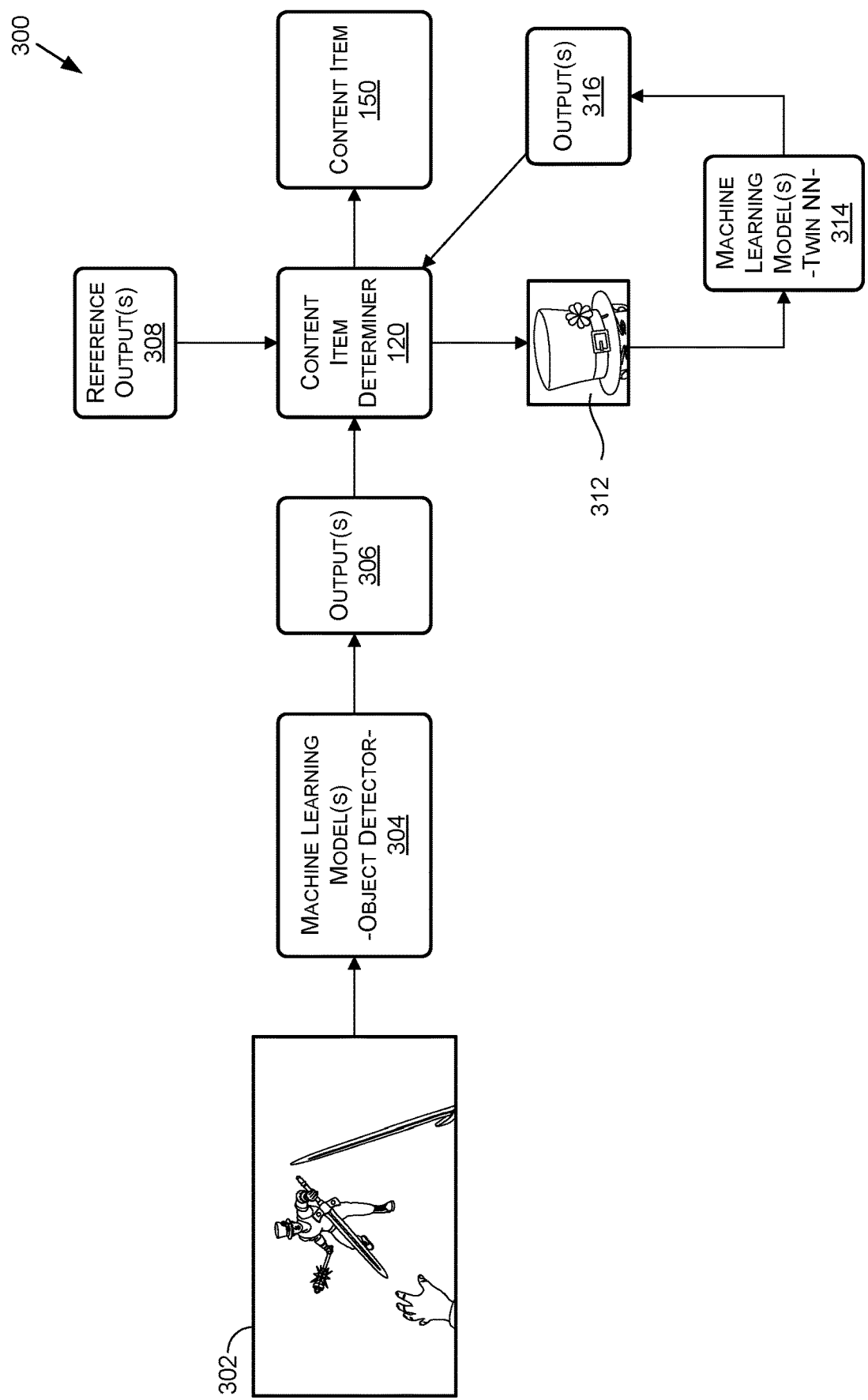
FIG. 3 is a block diagram showing a process for determining content items in video using machine learning models.

Referring now to FIG. 3, FIG. 3 is a block diagram 300, showing a process for determining content items in video using machine learning models. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Image data 302 representative of one or more frames of the video 156 may be applied to an object detector 304 of the MLMs 122 that may detect one or more objects within the image data 302. The object detector 304 may be trained to detect any of a number of distinct objects. Objects may include, by way of example and not limitation, game pieces, clothing, objects, skins, vehicles, buildings, towers, walls, players, crops, animals, etc. Multiple object detectors 304 and/or codebooks may be employed to detect different content items and/or types of content items. In some examples, the content item determiner 120 may select and/or determine the object detector(s) 304 from a plurality of object detectors trained to detect different types of objects. For example, the object detector(s) 304 that are used may be selected based at least on a game identifier of a game depicted in the video 156, content of the video 156, a user profile of the viewer of the video stream 114 and/or a streamer of the video 156, metadata associated with the video 156 and/or the video stream 114, etc.

In some examples, the object detector 304 may be trained to determine a bounding shape or region (e.g., bounding box) of each detected object, which may include bounding box coordinates. The bounding shape(s) may be captured in an output(s) 306 of the output detector 304. In embodiments, the bounding shape or region may correspond to the content item information 152 of FIG. 1. For example, a bounding shape may define a location, size, and/or shape of a graphical element of the content item information 152.

A content item determiner 120 may use the output(s) 306 to determine that one or more content items 150 are present within the video 156 that corresponds to the image data 302. The output(s) 306 may comprise, for example, unprocessed output of the object detector 304. Where the object detector 304 is based on a neural network (e.g., a CNN), the output may comprise tensor data indicating one or more detected objects and/or locations thereof (e.g., bounding shape locations). In some examples, an object detector 304 may be trained to detect particular content items. In such examples, a content item may correspond to an output class of an object detector 304. The content item determiner 120 may determine one or more content items identified by the object detector 304 based on confidence scores represented by the output(s) 306 and regarding the content items. For example, where the content item determiner 120 determines a confidence score exceeds a threshold value, the content item determiner 120 may identify that content item in the video 156. As further examples, an object detector 304 may be trained to detect a class or type of content item or object. For example, the output(s) 306 may be representative of confidence scores regarding classes or types of content items or objects. In such examples, the content item determiner 120 further use a twin neural network 314 to determine one or more content items 150 are present within the video 156.

In employing the twin neural network 314, the content item determiner 310 may receive reference output(s) 308 that may be used for comparison against output(s) 316 of the twin neural network 314. A reference output(s) 308 may, for example, comprise data that represents a specific content item that the system 100 is to identify. For example, a reference output 308 may include output of the twin neural network 314 that represents or is known to correspond to a particular content item. Different reference outputs 308 may correspond to different content items. As an example, prior to deployment, reference outputs 308 may be generated by applying known images of content items to the twin neural network 314. Outputs generated from one or more examples of a particular content item may be used to generate a reference output 308 for that content item. As an example, the outputs from different examples may be aggregated or otherwise combined into one or more feature vectors representing the content item from different sizes, angles, under different lighting conditions, or other contexts. A reference output 308 for a content item may be associated with a content identifier of the content item. For example, content identifiers may be indexed by reference output 308 to lookup a content identifier when a detected object is matched to the reference output 308.

In at least one embodiment, to match a detected object with a reference output 308, the content item determiner 120 may provide object data 312 that includes at least a portion of detected object as an input(s) to the twin neural network 314. The object data 312 may include an image or representation of a detected object in the image data 302. For example, the content item determiner 120 may crop the detected object out of one or more frames of the image data 302 and the object data 312 may include the cropped data. In various examples, a frame may be cropped based at least on the bounding shape determined using the object detector 304. In the example shown, the "shamrock hat" object that was detected as an object in the image data 302 may be cropped and transmitted in the object data 312.

Using the object data 312, the twin neural network 314 may encode the object data 312 to a representation that is based on, for example, positive and/or negative examples of a content item(s) 150. The encoding of the object data 312 may be include in the output(s) 316 and the content item determiner 120 may compare the encoding to the reference output(s) 308 to determine similarities between the encodings or to otherwise match the output(s) 316 to one or more reference outputs(s) 308. Data representing a level similarity, such as a similarity score or confidence score, may be computed by the content item determiner 120 and used to select one or more corresponding content items 150. For example, the content item determiner 120 may determine that a detected object is a particular content item based at least on a similarly score between the output 316 associated with the object and the reference output 308 associated with the content item. In at least one embodiment, the determination may be based at least on the similarity score exceeding a threshold value and/or based on a ranking of similarity score for the detected object and other content items (e.g., based on the similarity score being highest amongst a plurality of similarity scores for different content items). In at least one embodiment, the content identifier of a matched content item and/or metadata thereof—such as a location(s) or coordinates within the image data 302—may be provided to the presentation manager 124 and/or the application 106 of a client device(s) 104 for presentation of associated information, as described herein.

Figure 4:
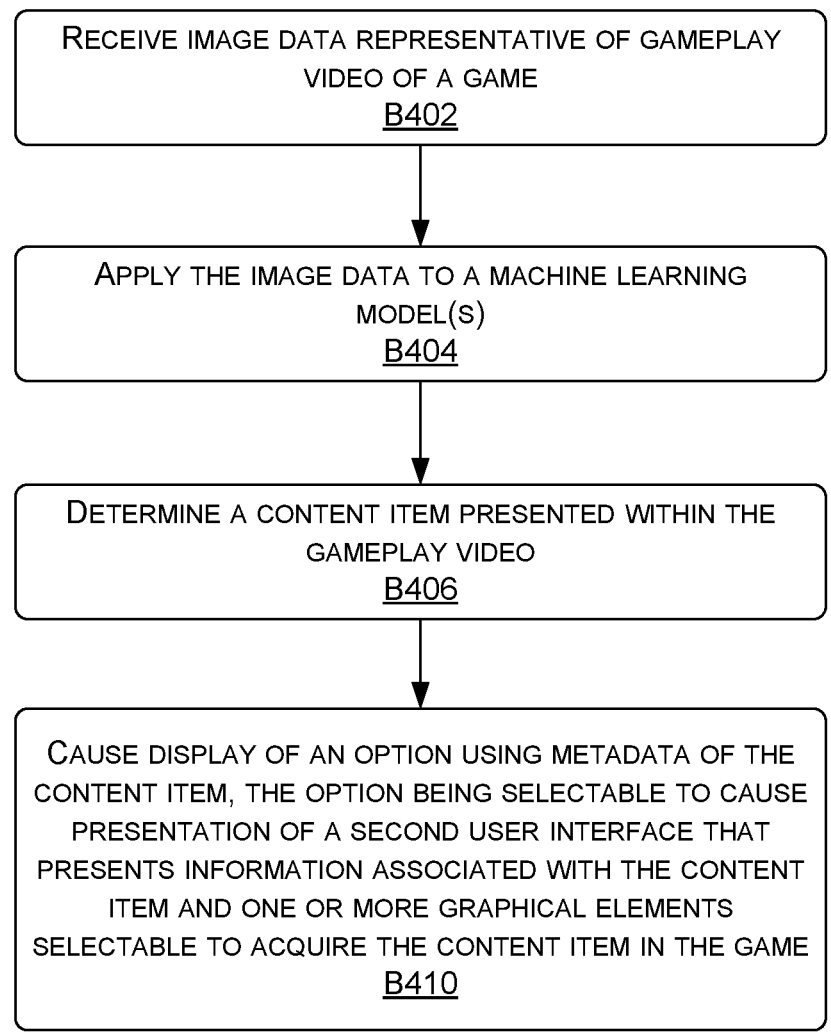
FIG. 4 is a flow diagram showing an example of a method for determining a content item, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the content item identification system of FIG. 1. However, this method may additionally or alternatively be executed by any one system, or any combination of systems, including, but not limited to, those described herein.

FIG. 4 is a flow diagram showing a method 400 for determining a content item, in accordance with some embodiments of the present disclosure. The method 400, at block B402, includes receiving image data representative of gameplay video of a game. For example, the identification servers 116 may receive the image data 302 representative of the video 156 associated with the application 106 of a client device(s) 104.

The method 400, at block B404, includes applying the image data to a machine learning model(s) trained to detect an object(s) and identify a content item(s) in the image data. For example, the machine learning model(s) 122 may be trained by the training module 118 to detect objects in video data and identify content items based on the detections.

The method 400, at block B406, includes determining a content item presented within the gameplay video. For example, based at least on detecting, using the MLM(s) 122, an object corresponding to the content item 150B within the video 156, a content item determiner 120 may determine the content item 150B presented within the video 156. The method 400, at block B408, includes causing display of an option using metadata of the content item, the option being selectable to cause presentation of a second user interface that presents information associated with the content item and one or more graphical elements selectable to acquire the content item in the game. For example, the presentation manager 124 of the identification server(s) 116 may transmit data that causes display of an option corresponding to content item information 152B using metadata of the content item 150B. The option may be selectable to cause presentation of the GUI 200 that presents information associated with the content item 150B and the graphical element(s) 206 that may be selectable to acquire the content item 150B in the game.

Figure 5:
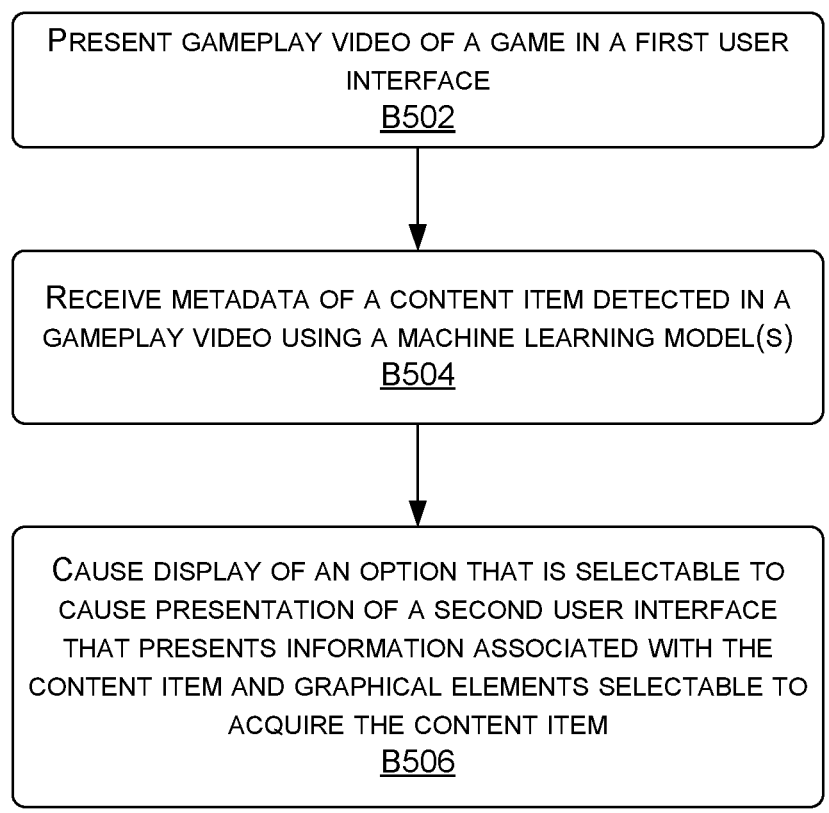
FIG. 5 is a flow diagram showing an example of a method for presenting information associated with a content item, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the content item identification system of FIG. 1. However, this method may additionally or alternatively be executed by any one system, or any combination of systems, including, but not limited to, those described herein.

FIG. 5 is a flow diagram showing a method 500 for presenting information associated with a content item, in accordance with some embodiments of the present disclosure. The method 500, at block B502, includes presenting gameplay video of a game in a first user interface. For example, the application 106 of a client device(s) 104 may receive gameplay video data corresponding to the video stream 114 and present the video 156 as shown in FIG. 1.

The method 500, at block B504, includes receiving metadata of a content item detected in a gameplay video using a machine learning model(s). For example, the application 106 of the client device(s) 104 may receive metadata from the presentation manager 124 of the identification server(s) 116 that is related to a content item 150 that is detected using the MLM(s) 122. In particular, the content item determiner 120 may apply gameplay video data corresponding to the video stream 114 to the MLM(s) 122 to detect one or more of the content item(s) 150.

The method 500, at block B506, includes causing display of an option that is selectable to cause presentation of a second interface that presents information associated with the content item and graphical elements selectable to acquire the content item. For example, the application 106 of the client device(s) 104 may display content item information 152, graphical feedback elements 154, and/or acquisition link(s) 158 associated with the video stream 114. Any of these may comprise graphical elements selectable to acquire a corresponding content item(s) 150. For example, in response to or based on a selection of an option, the GUI 200 may be presented in a second user interface.

Figure 6:
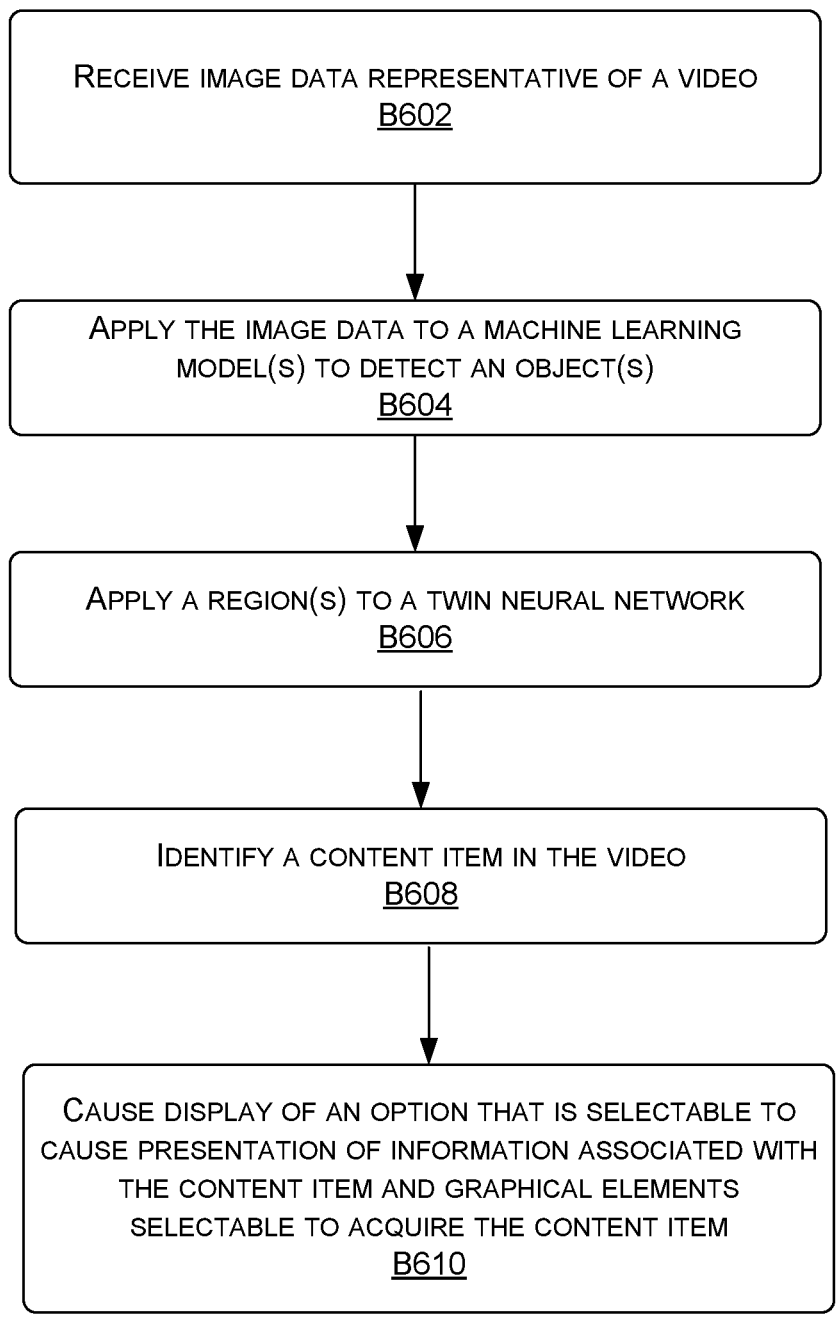
FIG. 6 is a flow diagram showing an example of a method for identification of a content item using a twin neural network in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the content item identification system of FIG. 1. However, this method may additionally or alternatively be executed by any one system, or any combination of systems, including, but not limited to, those described herein.

FIG. 6 is a flow diagram showing a method 600 for identification of a content item using a twin neural network, in accordance with some embodiments of the present disclosure. The method 600, at block B602, includes receiving image data representative of a video. For example, the identification servers 116 (or a client device 104 in some embodiments) may receive the image data 302 representative of the video 156 of a game that is being presented in the application 106 of a client device(s) 104. The content item determiner 120 may retrieve image data 302 from local and/or remote data store(s) 128 or may receive image data 302 from the streaming engine 132 of a video server(s) 130 (where the content item determiner 120B is employed, the streaming engine 132 may be providing the video stream 114 to the client device 104 and another video stream of the video 156 to an identification server 116).

The method 600, at block B604, includes applying the image data to a machine learning model(s) to detect an object(s). For example, the content item determiner 120 may apply the image data of the video 156 to the object detector 304 of the MLM(s) 122 to detect one or more objects in the image data. In some examples the MLM(s) have been trained by the training module 118. The object detector 304 may detect at least one region of the image data 302 corresponding to the detected objects. A region detected using the object detector 304 may correspond to the object data 312 of FIG. 3.

The method 600, at block B606, includes applying a region(s) to a twin neural network. For example, the content item determiner 120 may apply the region corresponding to the object data 312 and detected by the object detector 304, to the twin neural network 314 of the MLM(s) 122. The twin neural network 314 may have been trained to encode representations of the content item(s) 150 using positive and/or negative examples of the content item(s) 150.

The method 600, at block B608, includes identifying a content item in the video. For example, the twin neural network 314 of the MLM(s) 122 may generate the output(s) 316 comprising an encoding of the object data 312 that corresponds to the region. The content item determiner may compare the encoding to one or more encodings captured by the reference outputs(s) 308 to identify a content item 150 in the video 156.

The method 600, at block B610, includes causing display of an option that is selectable to cause presentation of information associated with the content item and graphical elements selectable to acquire the content item. For example, an application 106 of a client device(s) 104 may display content item information 152, graphical feedback elements 154, and/or acquisition link(s) 158 associated with the video stream 114. For example, the presentation manager 124 may cause display of one or more options corresponding to one or more of the graphical elements shown in FIG. 1 with respect to the display 108.

Example Computing Device

Figure 7:
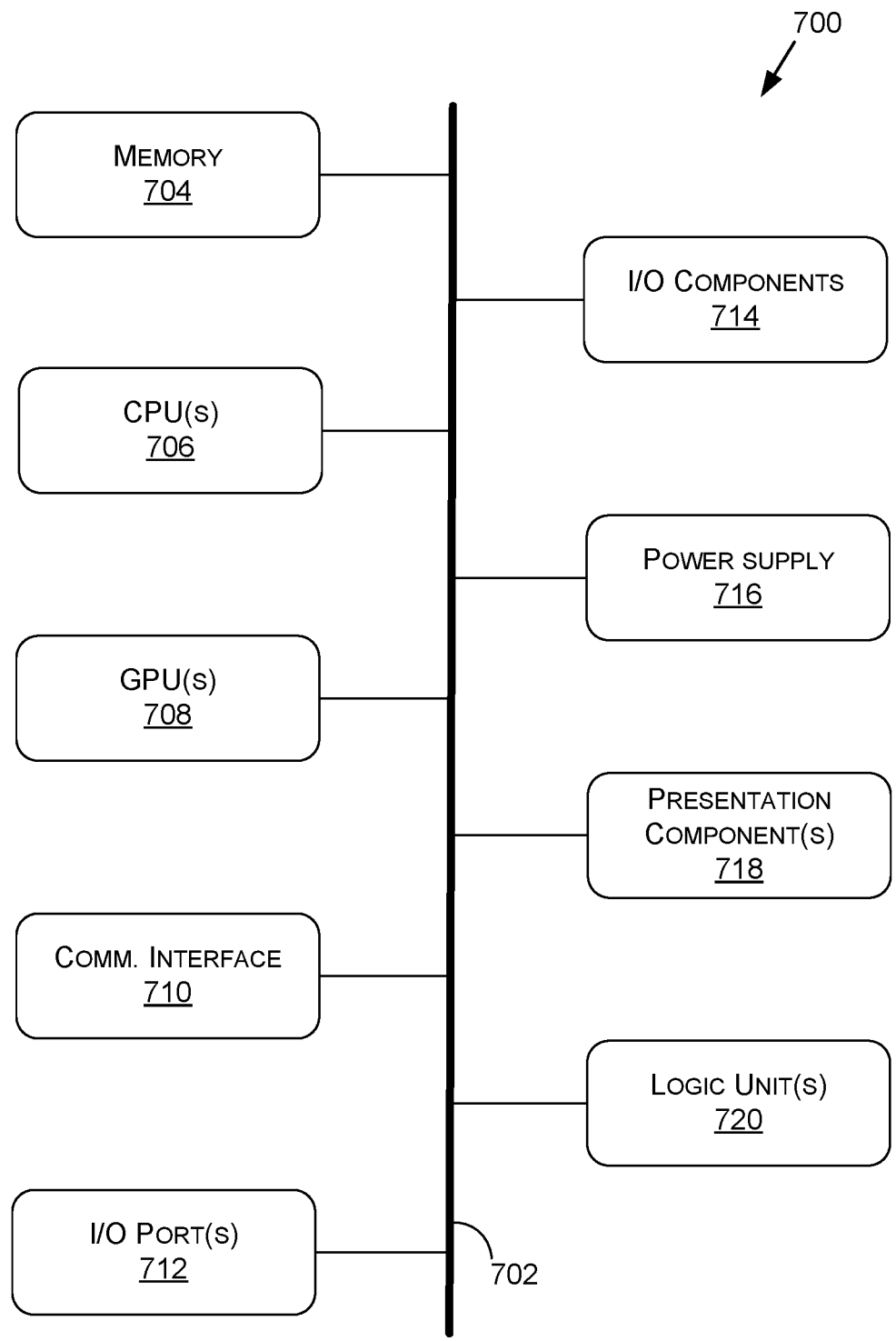
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

Example Content Streaming System

Figure 8:
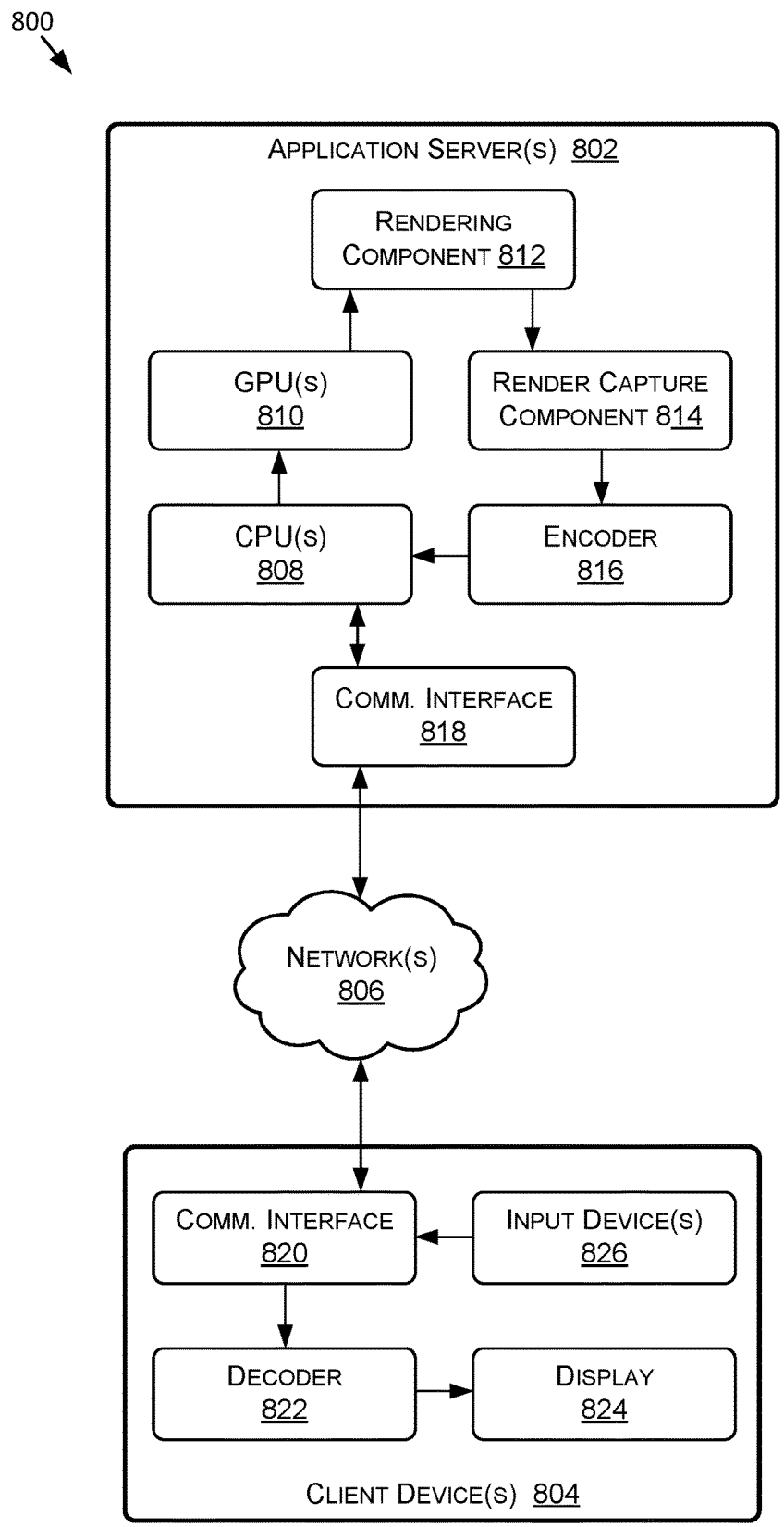
FIG. 8 is a block diagram of an example content streaming system suitable for use in implementing some embodiments of the present disclosure.

Now referring to FIG. 8, FIG. 8 is an example system diagram for a content streaming system 800, in accordance with some embodiments of the present disclosure. FIG. 8 includes application server(s) 802 (which may include similar components, features, and/or functionality to the example computing device 700 of FIG. 7), client device(s) 804 (which may include similar components, features, and/or functionality to the example computing device 700 of FIG. 7), and network(s) 806 (which may be similar to the network (s) described herein). In some embodiments of the present disclosure, the system 800 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 800, for an application session, the client device(s) 804 may only receive input data in response to inputs to the input device(s), transmit the input data to the application server(s) 802, receive encoded display data from the application server(s) 802, and display the display data on the display 824. As such, the more computationally intense computing and processing is offloaded to the application server(s) 802 (e.g., rendering—in particular ray or path tracing—for graphical output of the application session is executed by the GPU(s) of the game server(s) 802). In other words, the application session is streamed to the client device(s) 804 from the application server(s) 802, thereby reducing the requirements of the client device(s) 804 for graphics processing and rendering. In one or more embodiments, video 156 may be of the application session, which may be streamed to one or more viewers and/or a player of the game. For example, the player may receive a stream of the game in a gaming application that presents the stream, whereas a viewer may receive the stream in a video player application that presents the game (e.g., within a web browser). In various examples, the application server(s) 802 may comprise the video server(s) 130 or the video server(s) 130 may be separate from the application server(s) 802.

For example, with respect to an instantiation of an application session, a client device 804 may be displaying a frame of the application session on the display 824 based on receiving the display data from the application server(s) 802. The client device 804 may receive an input to one of the input device(s) and generate input data in response. The client device 804 may transmit the input data to the application server(s) 802 via the communication interface 820 and over the network(s) 806 (e.g., the Internet), and the application server(s) 802 may receive the input data via the communication interface 818. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 812 may render the application session (e.g., representative of the result of the input data) and the render capture component 814 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 802. In some embodiments, one or more virtual machines (VMs)—e.g., including one or more virtual components, such as vGPUs, vCPUs, etc.—may be used by the application server(s) 802 to support the application sessions. The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

Example Data Center

Figure 9:
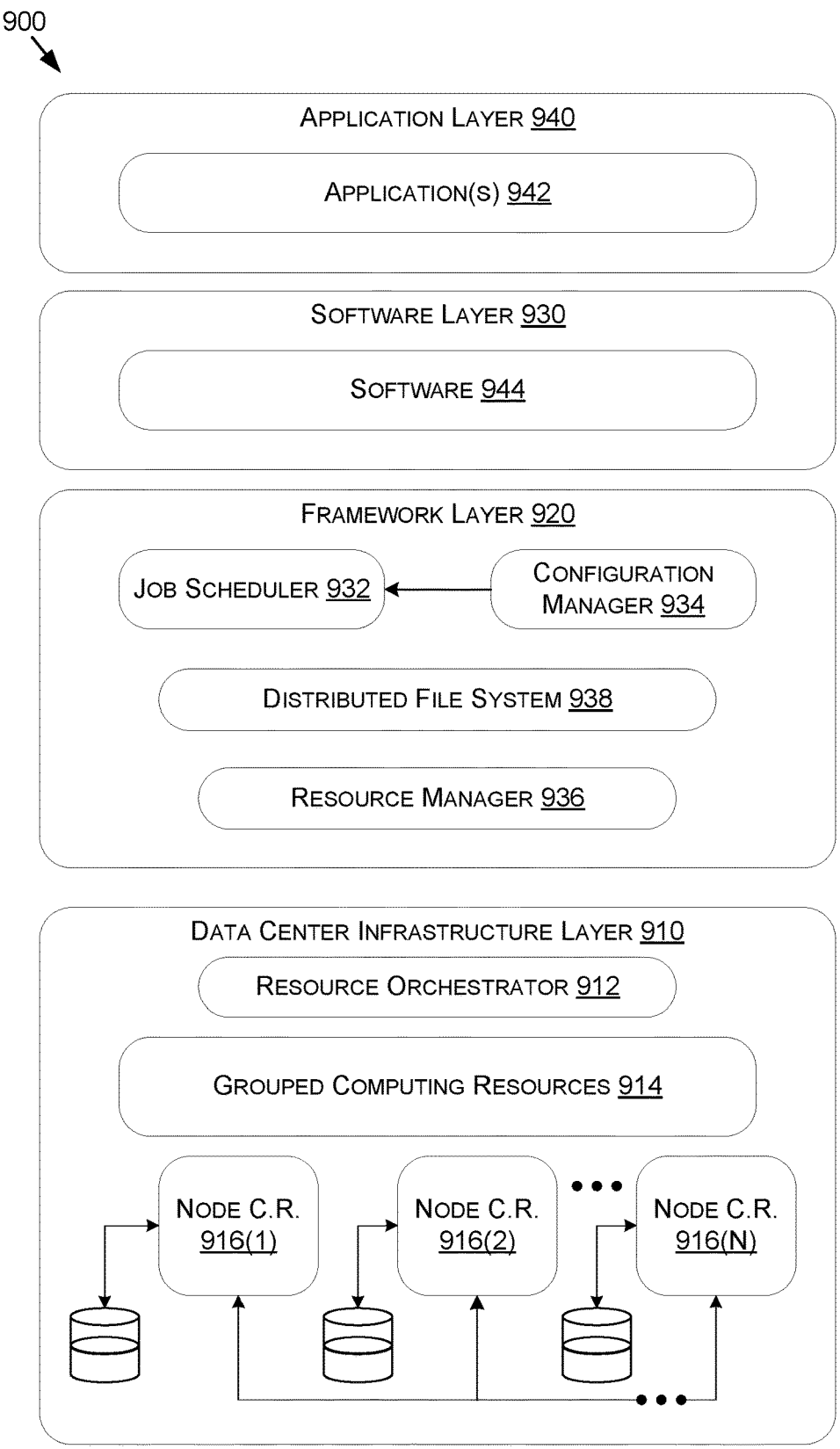
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, and/or other processors may be grouped within one or more racks to provide compute resources to support one or more workloads. The one or more racks may also include any number of power modules, cooling modules, and/or network switches, in any combination.

The resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for the data center 900. The resource orchestrator 922 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 944 of software layer 930 and/or one or more application(s) 942 of application layer 940. The software 944 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 1036 may coordinate with resource orchestrator 912 to manage these mapped or allocated computing resources.

In at least one embodiment, software 944 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   detecting, using one or more machine learning models (MLMs) and image data representative of a video of a video stream being presented in a user interface, one or more objects within the video;
   based at least on the detecting of the one or more objects, determining one or more content items presented within the video, at least one content item of the one or more content items corresponding to at least one object of the one or more objects; and
   causing presentation of information associated with the at least one content item and one or more graphical elements that include at least one link to at least one user interface to perform an acquisition of an instance of the at least one content item based at least on a selection of the one or more graphical elements.

2. The method of claim 1, wherein the presentation is based at least on a user input to the user interface being associated with the at least one content item.

3. The method of claim 1, further comprising accessing a data store using a content identifier of the at least one content item to retrieve metadata of the at least one content item, wherein the presentation uses the metadata.

4. The method of claim 1, wherein the one or more MLMs include a twin neural network, and the determining the one or more content items uses the twin neural network to identify the at least one content item in a region of the video.

5. The method of claim 1, wherein the video stream is from a pipeline of a video platform that serves video streams of the video to a plurality of users.

6. The method of claim 1, wherein at least one of the one or more MLMs is trained to identify the at least one content item using positive examples of the at least one content item.

7. The method of claim 1, wherein the determining the one or more content items includes comparing encoded representations of content items to an encoded representation of one or more portions of the video.

8. The method of claim 1, wherein the one or more MLMs detect the at least one object in a region of one or more frames of the video, and an option is presented in the user interface at a location that corresponds to the region.

9. The method of claim 1, wherein an option is presented with a plurality of frames of the video based at least on tracking the at least one object across the plurality of frames.

10. A system comprising:
    one or more processors to execute operations comprising:
       detecting, using one or more machine learning models (MLMs) and image data representative of a video of a video stream being presented in a user interface, one or more objects within the video;
       based at least on the detecting of the one or more objects, determining one or more content items presented within the video, at least one content item of the one or more content items corresponding to at least one object of the one or more objects; and
       causing presentation of information associated with the at least one content item and one or more graphical elements that include at least one link to at least one user interface to perform an acquisition of an instance of the at least one content item based at least on a selection of the one or more graphical elements.

11. The system of claim 10, wherein the one or more graphical elements are presented in one or more of the user interface, an e-mail, a text message, a notification, or a pop-up.

12. The system of claim 10, wherein one or more graphical elements include an overlay to the video in the user interface, the overlay displayed in association with a region of one or more frames of the video.

13. The system of claim 10, wherein metadata of the at least one content item comprises an indication of one or more frames of the video and the presentation is in association with the one or more frames based at least on the metadata.

14. The system of claim 10, wherein the video comprises one or more of gameplay video of a game or application video of an application session.

15. The system of claim 10, wherein the system is comprised in at least one of:
    a system for performing one or more simulation operations;

a system for performing one or more digital twin operations;
a system for performing light transport simulation;
a system for performing one or more deep learning operations;
a system for performing one or more generative AI operations;
a system implemented using an edge device;
a system incorporating one or more virtual machines (VMs);
a system implemented at least partially in a data center; or
a system implemented at least partially using cloud computing resources.

16. At least one processor comprising:
one or more circuits to cause presentation of information associated with at least one content item and one or more graphical elements that include at least one link to at least one user interface to perform an acquisition of an instance of the at least one content item based at least on a selection of the one or more graphical elements, the presentation being based least on:
detecting, using one or more machine learning models (MLMs) and image data representative of a video of a video stream being presented in a user interface, one or more objects within the video; and
based at least on the detecting of the one or more objects, determining one or more content items presented within the video, the at least one content item of the one or more content items corresponding to at least one object of the one or more objects.

17. The at least one processor of claim 16, wherein the determining the one or more content items includes comparing at least a first output of the one or more MLMs that is associated with the at least one content item with at least a second output of the one or more MLMs that corresponds to at least one region in the video.

18. The at least one processor of claim 16, wherein the presentation is based at least on a user input to the user interface being associated with the at least one content item.

19. The at least one processor of claim 16, wherein the one or more circuits are further to access a data store using a content identifier of the at least one content item to retrieve metadata of the at least one content item, wherein the presentation uses the metadata.

20. The at least one processor of claim 16, wherein the processor is comprised in at least one of:
a system for performing one or more simulation operations;
a system for performing one or more digital twin operations;
a system for performing light transport simulation;
a system for performing one or more deep learning operations;
a system for performing one or more generative AI operations;
a system implemented using an edge device;
a system incorporating one or more virtual machines (VMs);
a system implemented at least partially in a data center; or
a system implemented at least partially using cloud computing resources.

* * * * *